United States Patent
Reimann

[15] 3,697,649
[45] Oct. 10, 1972

[54] PROCESS FOR THE PRODUCTION OF ANTIBIOTIC W847-A FROM RELATED ANTIBIOTICS

[72] Inventor: Hans Reimann, Wayne, N.J.
[73] Assignee: Schering Corporation, Bloomfield, N.J.
[22] Filed: May 6, 1968
[21] Appl. No.: 726,738

[52] U.S. Cl. ..................................424/120, 424/121
[51] Int. Cl. ..............................................A61k 21/00
[58] Field of Search.......................424/121, 122, 120

[56] References Cited

UNITED STATES PATENTS 3,087,859   4/1963   Smythe et al..............424/122

*Primary Examiner*—Albert T. Meyers
*Assistant Examiner*—Daren M. Stephens
*Attorney*—Stephen B. Coan, Raymond A. McDonald and Bruce M. Eisen

[57] ABSTRACT

Antibiotic W847 Complex or components thereof are converted into one discrete substance, Antibiotic W847-A, by controlled alkaline hydrolysis.

8 Claims, 8 Drawing Figures

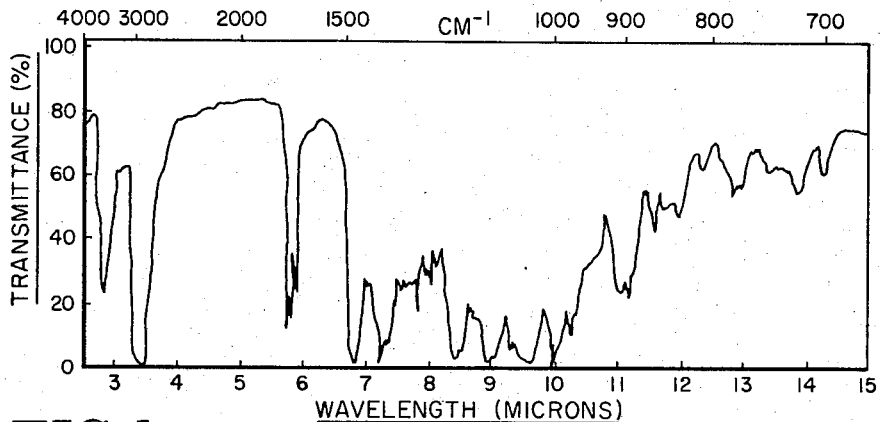
FIG. 1 INFRARED SPECTRUM OF ANTIBIOTIC W847−A
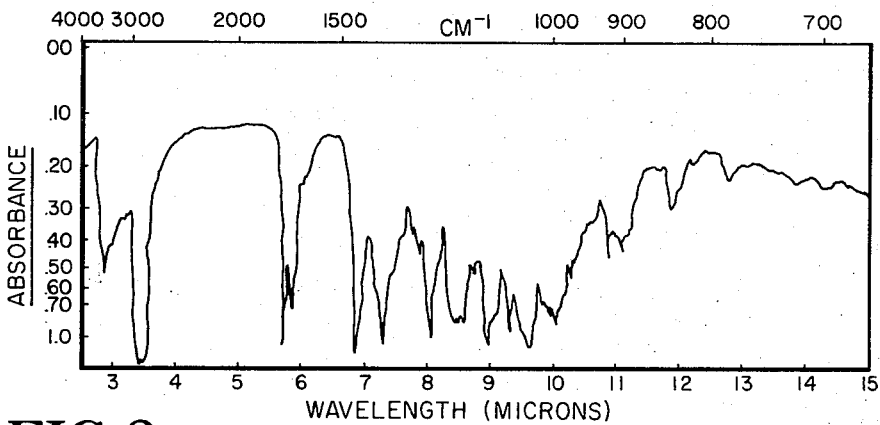
FIG. 2 INFRARED SPECTRUM OF ANTIBIOTIC W847−B
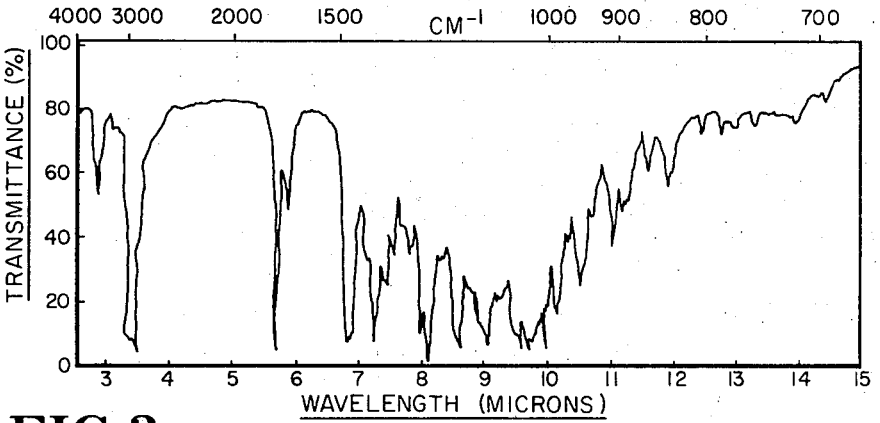
FIG. 3 INFRARED SPECTRUM OF ANTIBIOTIC W847−$C_1$
*INVENTOR.*
HANS REIMANN
BY Bruce M. Eisen

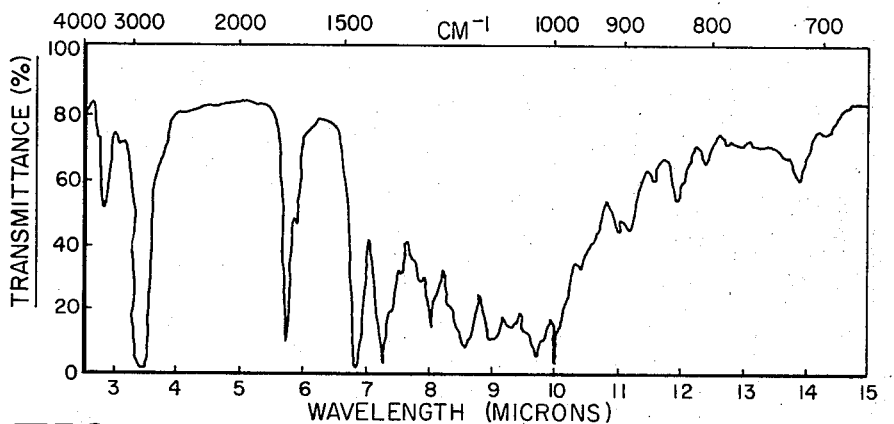
FIG. 4  INFRARED SPECTRUM OF ANTIBIOTIC W847-C$_2$
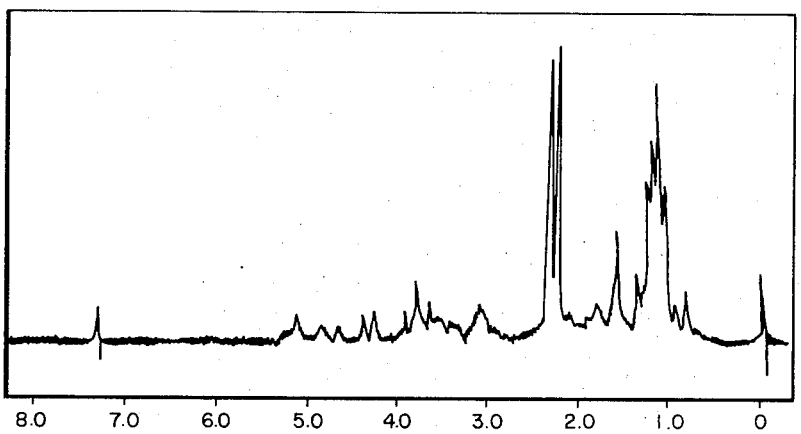
FIG. 5  NUCLEAR MAGNETIC RESONANCE SPECTRUM OF ANTIBIOTIC W847-A
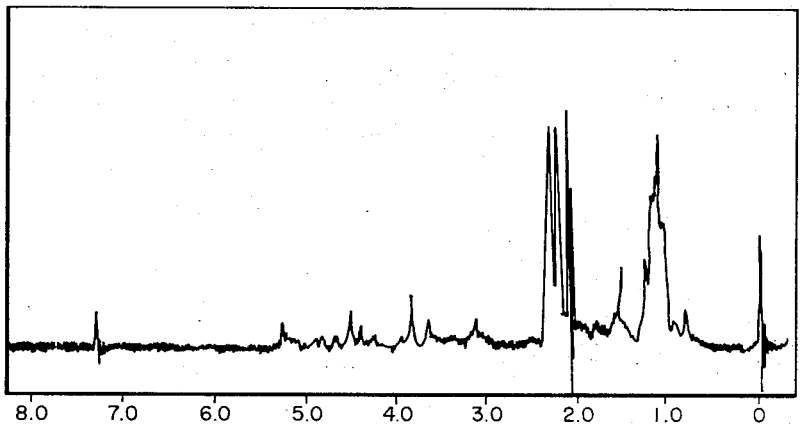
FIG. 6  NUCLEAR MAGNETIC RESONANCE SPECTRUM OF ANTIBIOTIC W847-B
INVENTOR:
HANS REIMANN
BY Bruce M. Eisen

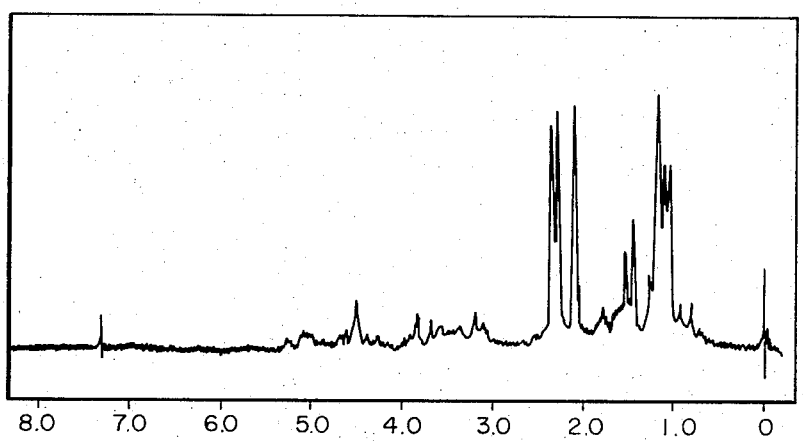
FIG.7 NUCLEAR MAGNETIC RESONANCE SPECTRUM OF ANTIBIOTIC W847-$C_1$
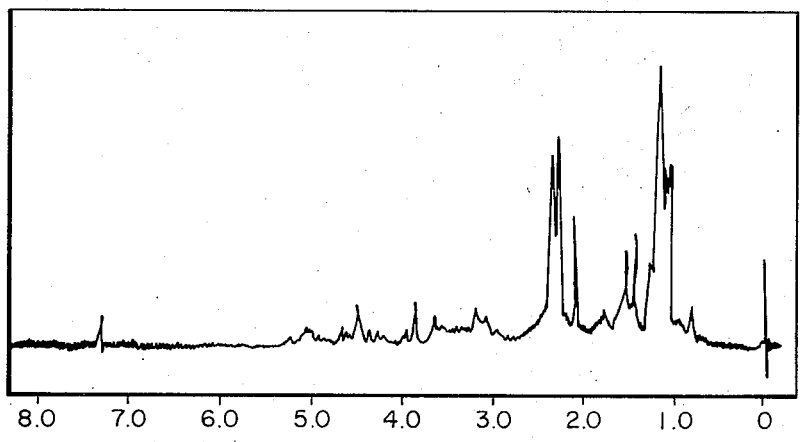
FIG.8 NUCLEAR MAGNETIC RESONANCE SPECTRUM OF ANTIBIOTIC W847-$C_2$

PROCESS FOR THE PRODUCTION OF ANTIBIOTIC W847-A FROM RELATED ANTIBIOTICS

This invention relates to the transformation of closely related antibiotic substances, which may be co-produced, into one discrete crystalline antibiotic substance. More specifically, this invention relates to a process for converting the several fractions of Antibiotic W847 Complex into one fraction, Antibiotic W847-A.

Antibiotic W847 Complex exhibits broad spectrum antibiotic activity. The complex contains four major fractions or components and these are designated Fractions A, B, $C_1$ and $C_2$. As will be appreciated by those skilled in the art, it is highly desirable to have single antibiotic fractions available for use, as opposed to a complex, since one can administer a single fraction with greater assurance of uniformity in its potency, effects, concentration, absorption and the like. Similarly, it is desirable to have the antibiotic available as a single pure crystalline compound to provide uniform standards of purity and dosage.

The microbiological production of Antibiotic W847 Complex and its fractions is described in commonly assigned copending application, Ser. No. 707,100 filed Feb. 21, 1968 by Marvin J. Weinstein, George M. Luedemann, Gerald H. Wagman and Joseph A. Marquez, now abandoned. By the method disclosed therein, the several fractions are isolated by tedious, lengthy chromatographic techniques. I have now discovered that Fractions B, $C_1$ and $C_2$ may be directly converted into pure crystalline W847-A by hydrolysis under alkaline conditions.

Antibiotic W847-A itself is present in the Antibiotic W847 Complex produced in the fermentation broth only in a relatively small amount, i.e. less than 10%. The major component is the W847-$C_1$. Present studies have shown that W847-A has several distinct advantages as compared to the major component W847-C in terms of better tolerance, less subacute toxicity, better activity against gram-negative organisms, higher peak blood levels and slightly better protective activity in mice.

In the preferred mode of operation, the conversion process is carried out on the components without isolating them from the W847 fermentation broth. It can also be effected on the isolated W847 Complex (generally obtained by extracting the broth with a water immiscible solvent and concentrating) or on the further isolated W847-C Complex. It is also within the scope of this invention, however, to effect the conversion with the individual fractions either isolated from the W847 Complex or synthetically produced.

Antibiotic W847 Complex can be formed by cultivating the microorganism Micromonospora Sp. W847 in an aqueous nutrient medium under submerged aerobic conditions. These microorganisms are of the genus Micromonospora and of the order Actinomycetales. Cultures of living organisms of two strains of this genus have been deposited and made a part of the stock culture collection of the United States Department of Agriculture, Northern Utilization Research and Development Division, Peoria, Illinois, where they have been designated NRRL 3274 and NRRL 3275. These strains are available from the collection agency upon request.

The instant invention, however, is not to be construed as limited to the conversion of Antibiotic W847 Complex, W847-B, W847-C complex, W847-$C_1$ or W847-C only when they are produced through utilization of Micromonospora sp. W847 var. NRRL 3274 or var. NRRL 3275. Firstly, one may also utilize other variants of Micromonospora sp. W847 or mutants thereof produced from this organism by mutating agents such as, for example, high frequency radiation including x-ray and ultra-violet, actinophages and nitrogen mustard. Secondly, other microorganisms may produce one or more Antibiotic W847 fractions. Thirdly, synthetically produced Antibiotic W847 fractions could similarly be hydrolyzed to W847-A. In other words, the process of this invention is applicable and effective in converting antibiotic substances W847-B, W847-$C_1$ and W847-$C_2$ and their mixtures to Antibiotic W847-A regardless of how the former substances are themselves produced.

The starting materials of this invention can each be positively identified without reference to their method of manufacture. Antibiotic W847 Complex possesses an antibacterial spectrum substantially as shown in Table 1 with substantially no diminution in potency after contact for 24 hours at 37° C with any of the following enzymes: trypsin, chymotrypsin, pepsin, $\alpha$ - amylase and penicillinase.

Antibiotic Fractions A, B, $C_1$ and $C_2$ can be positively identified by their chemical and physical properties as listed in Table 2; their infrared spectra as shown in FIGS. 1, 2, 3 and 4, respectively; their nuclear magnetic resonance (NMR) spectra as shown in FIGS. 5, 6, 7 and 8 respectively; and their antibacterial spectra as shown in Table 1. The infrared spectra were run in mineral oil (Nujol) and the more significant absorption peaks are set forth in Table 3 with the following designations: S=strong, M=moderate, W=weak, VS=very strong, M-S=moderate to strong, brd.=broad, shp.=sharp, shd.=shoulder and s.b.=side band. The NMR spectra were observed on a Varian A–60–A spectrometer on a solution (ca 0.4 ml, ca 20 mg/ml) of the sample of each fraction in deuterated chloroform. The spectra are recorded in parts per million (PPM) from tetramethylsilane, the internal standard. In Table 1, the susceptibility of the test organisms to the antibiotics was determined by a tube dilution assay in yeast beef broth adjusted to pH 8.0 with sodium hydroxide.

TABLE 1.—ANTIBACTERIAL SPECTRUM OF ANTIBIOTIC W847 COMPLEX AND FRACTIONS A, B, $C_1$ $C_2$ AND C-COMPLEX

| | Minimal inhibitory concentration (mcg./ml.) Antibiotic W847 | | | | | | |
|---|---|---|---|---|---|---|---|
| Microorganism | Complex base | Complex HCl | Fraction A | Fraction B | Fraction $C_1$ | Fraction $C_2$ | C-complex |
| Bacillus megatherium DA 7064 | 0.3 | 0.3 | 0.6 | 1.2 | 0.3 | 0.6 | 0.3 |
| Bacillus subtilis ATCC 6633 | 0.03 | 0.3 | 0.005 | 0.05 | 0.03 | 0.005 | 0.005 |
| Diplococcus pneumoniae DA 700 | | | 1.2 | 1.2 | | 0.6 | |
| Diplococcus pneumoniae ATTCC 10015 | | | 0.5 | 0.5 | | 0.05 | |
| Diplococcus pneumoniae DA 150 | 6.0 | 6.0 | >2.7 | >2.7 | 12.0 | >2.7 | >2.7 |
| Enterococcus sp. DA 800 | 0.3 | 0.75 | 0.6 | 0.6 | 0.3 | 0.08 | 0.3 |
| Enterococcus sp. DA 801 | 0.3 | 0.75 | 0.6 | 0.6 | 0.3 | 0.6 | 0.3 |
| Enterococcus sp. DA 802 | 0.3 | >1.0 | 0.2 | 0.2 | 0.3 | 0.03 | 0.3 |
| Sarcina lutea ATCC 9341 | 0.0075 | .0075 | 0.005 | 0.005 | 0.0075 | 0.0005 | 0.00075 |

TABLE 1.—Continued

ANTIBACTERIAL SPECTRUM OF ANTIBIOTIC W847 COMPLEX AND FRACTIONS A, B, C₁ C₂ AND C-COMPLEX

| Microorganism | Minimal inhibitory concentration (mcg./ml.) Antibiotic W847 | | | | | | |
|---|---|---|---|---|---|---|---|
| | Complex base | Complex HCl | Fraction A | Fraction B | Fraction C₁ | Fraction C₂ | C-complex |
| Staphylococcus aureus ATTC 12715 | 0.3 | 0.75 | 0.08 | 0.2 | 0.3 | 0.005 | 0.03 |
| Staphylococcus aureus ATCC 6538P | 0.3 | 0.03 | 0.6 | 0.2 | 0.03 | 0.005 | 0.03 |
| Staphylococcus aureus ATCC 11631* | 0.3 | 0.075 | 0.6 | 0.6 | 0.3 | 0.6 | 0.3 |
| Staphylococcus aureus (Gray) | 0.3 | 0.3 | 0.6 | 0.6 | 0.3 | 0.6 | 0.5 |
| Staphylococcus aureus DA 2001 | 0.03 | 0.3 | 0.6 | 0.2 | 0.03 | 0.03 | 0.03 |
| Staphlyococcus aureus DA 2003 | 0.03 | 0.03 | 0.6 | 0.6 | 0.075 | 0.6 | 0.3 |
| Staphylococcus aureus DA 2010 | 0.3 | 0.3 | 0.6 | 0.6 | 0.3 | 0.2 | 0.25 |
| Staphylococcus aureus DA 2014 | 0.3 | 0.3 | 0.6 | 0.6 | 0.03 | 0.6 | 0.03 |
| Staphylococcus aureus DA 2018 | 0.3 | 0.3 | 0.6 | 0.6 | 0.075 | 0.1 | 0.1 |
| Staphylococcus aureus DA 2032 | 0.075 | 0.3 | 0.6 | 0.6 | 0.075 | 0.08 | 0.08 |
| Staphylococcus aureus DA 2033** | >16 | >16 | >2.7 | >2.7 | >32.0 | >2.7 | >2.7 |
| Streptococcus facalis DA20 | 0.3 | 0.3 | 0.03 | 0.1 | 0.3 | 0.005 | 0.075 |
| Streptococcus pyogenes DA 21 | 0.75 | >1.0 | 5.0 | 5.0 | 0.3 | 0.6 | 0.3 |
| Streptococcus pyogenes DA 11 | 0.3 | | 0.6 | 0.2 | 0.3 | 0.03 | 0.3 |
| Streptococcus pyogenes DA 12 | | | 0.2 | 0.2 | | 0.03 | |
| Mycobacterium smegmatis ATCC 10143 | 0.75 | 0.3 | 5.0 | 5.0 | 0.3 | 0.05 | 0.3 |
| Escherichia coli ATCC 10536 | 6.0 | >16 | 6.0 | 12.0 | 12.0 | 12.0 | 12.0 |
| Klebsiella pneumoniae ATCC 10031 | 12.0 | >16 | 6.0 | 24.0 | 12.0 | 24.0 | 12.0 |
| Proteus vulgaris DA 121 | 6.0 | >16 | 12.0 | 24.0 | 24.0 | 24.0 | 24.0 |
| Pseudomonas aeruginosa ATCC 8689 | 6.0 | 12.0 | 6.0 | 12.0 | 6.0 | 6.0 | 6.0 |
| Salmonella schottmuelleri DA 10 | 6.0 | 12.0 | 6.0 | 12.0 | 12.0 | 12.0 | 12.0 |

\* Penicillin resistant strain.
\*\* Erythromycin resistant strain.
Medium: Yeast beef broth (pH 8.0).
Complex = Mixture of components A, B, C₁ and C₂.

TABLE 2.—CHEMICAL AND PHYSICAL PROPERTIES OF ANTIBIOTIC W847 FRACTIONS

| | Fraction A | Fraction B | Fraction C₁ | Fraction C₂ |
|---|---|---|---|---|
| Optical rotation [α] $D^{25}$ 1% in ethanol | −90° | −92° [1] | −104° | −102° |
| Melting point | 255°–259° C. dec. | 125°–135° C. dec.[1] | 243°–246° C. dec. | 146°–150° C. dec. |
| PKa | 9.1 | 8.8 | 8.8 | 8.6 |
| Neutralization eq | 442 | 490 | 488 | 492 |

| Elemental analysis | Found | Calc. | Found [1] | Calc. [1] | Found | Calc. | Found | Calc. |
|---|---|---|---|---|---|---|---|---|
| Carbon | 60.23 | 60.25 | 58.90 | 58.95 | 60.23 | 59.98 | 60.54 | 60.35 |
| Hydrogen | 9.28 | 9.19 | 8.94 | 9.03 | 8.93 | 8.81 | 8.60 | 8.89 |
| Nitrogen | 3.30 | 3.19 | 2.88 | 2.99 | 2.94 | 2.92 | 2.87 | 2.87 |
| Oxygen (by difference) | 27.19 | 27.36 | 29.18 | 29.03 | 27.90 | 28.30 | 27.99 | 27.89 |
| Empirical formula | $C_{44}H_{80}N_2O_{15}$ | | $C_{45}H_{82}N_2O_{16}$ | | $C_{48}H_{84}N_2O_{17}$ | | $C_{49}H_{86}N_2O_{17}$ | |
| Molecular weight | 877.10 | | 919.14 | | 961.71 | | 975.20 | |

[1] Monohydrate.

TABLE 3.—INFRARED SPECTRA OF ANTIBIOTIC W847 FRACTIONS

| Fraction A | | Fraction B | | Fraction C₁ | | Fraction C₂ | |
|---|---|---|---|---|---|---|---|
| Wavelength (μ) | Peak strength | Wavelength | Peak strength | Wavelength | Peak strength | Wavelength | Peak strength |
| 2.82–2.90 | M-S, brd | 2.87 | M | 2.82 | s.b | 2.83 | W-M. |
| 3.35–3.50 | Nujol | 2.97 | shd | 2.87 | W | 3.33–3.48 | Nujol. |
| 5.77 | S | 3.35–3.50 | Nujol | 3.35–3.50 | Nujol | 5.70 | S. |
| 5.82 | (Instrument artifact) | 5.72 | S | 5.72 | S | 5.80 | (Instrument artifact). |
| 5.88 | M-S | 5.83 | S | 5.87 | W-M | 5.88 | shd. |
| 6.82 | Nujol | 6.82 | Nujol | 6.82 | Nujol | 6.80 | Nujol. |
| 7.24 | Nujol | 7.25 | Nujol | 7.25 | Nujol | 7.23 | Nujol. |
| 7.36 | s.b | 8.05 | S | 7.45 | M | 8.00 | S. |
| 7.82 | M-S, shp | 8.45 | S, brd | 7.57 | M | 8.53 | S, brd. |
| 8.45 | VS, brd | 8.59 | S | 7.82 | M | 8.93 | S. |
| 8.92 | VS | 8.94 | S | 8.03 | S | 9.08 | shd. |
| 9.02 | VS | 9.30 | S | 8.13 | VS | 9.27 | M-S. |
| 9.12 | VS | 9.62 | S | 8.60 | S | 9.65 | S. |
| 9.32 | M-S | 9.91 | M-S | 8.94 | M-S | 10.00 | M-S, brd. |
| 9.53 | VS | 10.02 | M-S | 9.05 | S | 10.38 | M. |
| 9.63 | VS | 10.29 | M | 9.56 | S | 10.97 | M. |
| 9.98 | VS | 10.84 | W-M | 9.70 | S | 11.15 | M. |
| 10.27 | S | 11.08 | W-M | 10.13 | M-S | 11.52 | M. |
| 11.02 | M-S | 11.20 | W-M | 10.48 | M | 11.92 | W-M. |
| 11.17 | M-S | | | 11.02 | W-M | | |
| | | | | 11.18 | W-M | | |

As is apparent from Table 1, Antibiotic W847-A exhibits a broad range of anti-microbial activity against both gram-positive and gram-negative microorganisms. Included in the gram positive group are pathogenic microorganisms including species of the genus Streptococcus, Staphylococcus and Diplococcus which are known to cause many disease manifestations. Various species of Staphylococcus and Streptococcus are the organisms responsible for causing bovine mastitis. These species are readily controlled and treated by means of antibiotic W847-A after a relatively brief regimen of administration. Antibiotic W847-A is also active against gram-negative organisms including species of the genus Escherichia, Salmonella, Proteus and Pseudomonas. These organisms are responsible for many serious disease syndromes including urinary tract infections and diarrheas. Such syndromes are quite common in domestic animals such as cattle, horses, sheep, swine, dogs and cats and may be effectively controlled and treated by means of antibiotic W847-A.

Antibiotic W847-A suspended in 0.5% aqueous carboxymethylcellulose and dispersed by ultrasonication is active by subcutaneous administration in mice against *S. aureus* Gray with a $PD_{50}$ (protective dose for 50 percent of the population tested) of 20 mg/kg and against *P. aeruginosa* with a $PD_{50}$ of 161 mg/kg. The $LD_{50}$ is mice by the subcutaneous route is 7,000 mg/kg.

Antibiotic W847-A may also be used to clean and sterilize laboratory glassware, surgical instruments and the like. It may also be used in combination with soaps and detergents to clean and sanitize areas used for food preparation such as kitchens, dining halls and the like.

According to the process of this invention, the Antibiotic W847 starting material is subjected to hydrolysis under non-acidic conditions and specifically at a pH in the range of about 9 to about 12 until the conversion to W847–A is substantially complete.

The completeness of hydrolysis can be checked in several ways. One convenient procedure employs thin layer chromatography and consists of removing a 10 milliliter aliquot of the reaction mixture and, if necessary, adding enough sulfuric acid to lower the pH to within the range of about 9.0–9.5. The aliquot is then extracted with 15 ml. of ethyl acetate and the extract concentrated to dryness under reduced pressure. The residue is then dissolved in 0.2 ml. of 95% ethanol and 20 $\mu$l. (20$\lambda$) of this solution is spotted on thin layer silica gel GF plates (Analtech, Inc.) using a 40% methanol–60% chloroform solvent system. A like amount of an authentic antibiotic W847–A sample is similarly spotted. After 15–30 minutes, the plates are sprayed with a mixture of concentrated sulfuric acid-methanol (1:1 v/v) and developed by heating at 105°C for several minutes. The position and color of the two spots are compared.

The hydrolysis rate can be increased by working at elevated temperatures. The use of such elevated temperatures is not practical, however, when hydrolyzing the broth directly or when ammonium hydroxide is used to render the medium basic.

Materials suitable for rendering the hydrolysis medium basic include ammonium hydroxide, sodium hydroxide, potassium hydroxide, calcium hydroxide, sodium carbonate, sodium bicarbonate and the like. Again, the amount added must be such as to produce a pH within the range of about 9 to about 12.

Significant decomposition results if the hydrolysis is conducted under acidic pH condition or at a pH above about 12. Hydrolysis at a pH of at least 7 but less than about 9 is too slow to be practical. The latter point is evidenced by the fact that the fermentation mixture is within this range, and yet after the several days required for fermentation, only a minor amount of W847–A is present (less than 10%).

As noted above, the direct hydrolysis of the fermentation broth is preferred. Among other advantages, the procedure allows the Antibiotic W847–A to be removed from the broth by extraction with about one-fifth the broth volume of methylene chloride or equivalent solvent. On the other hand, when the antibiotic complex W847 is first isolated from the broth, it requires about twice the broth volume of solvent. The broth can be filtered before or after effecting the hydrolysis process of this invention. Generally a filter aid such as Celite or Supercel is added before filtration.

After hydrolysis of the fermentation broth according to the method of this invention, the filtered broth is extracted with a water-immiscible polar organic solvent such as methylene chloride and the extract is concentrated. Crystallization of the concentrate may be aided by addition of a solvent such as acetone in which Antibiotic W847–A has limited solubility.

When the alkaline hydrolysis reaction is not performed on the whole broth, the solvent system should preferably contain a water-miscible polar organic component in order to increase the solubility of the Antibiotic W847 components and thus increase the rate of hydrolysis. Methanol represents such a convenient component. Other such water miscible organic solvents are ethanol, isopropanol, acetone and dimethylacetamide. Of course, the component must be one which is not itself saponified under the reaction conditions.

Although I do not wish to be limited by my theory of the chemistry underlying the conversion process of my invention, it appears to involve surprisingly selective saponification reactions. More specifically, Antibiotic W847 appears to contain a lactone ring and at least four esterifiable hydroxyl groups. In Antibiotic W847–A these four hydroxyl groups are apparently not esterified. Antibiotic fractions B, $C_1$ and $C_2$ appear to be monoacetate, diacetate and monoacetate-monopropionate esters of Antibiotic W847–A. Under the selective alkaline hydrolysis conditions of the process of this invention, the esters are apparently saponified to the free hydroxyl groups without causing cleavage of the lactone ring or any other degradation or rearrangement of the antibiotic macrostructure. This is surprising in that cleavage of the lactone ring under such conditions might have been expected. Under acidic or highly basic hydrolysis conditions, antibiotic W847 does indeed degrade.

Example 1 illustrates the preparation of Antibiotic W847 Complex by fermentation and Examples 2 and 3 illustrate means for extracting the complex from the fermentation broth. Such processes are disclosed in the aforesaid copending application Ser. No. 707,100 now abandoned.

EXAMPLE 1

Production of Antibiotic W847 Complex

Add a 0.5 ml. lyophilized culture of Micromonospora sp. W847 to a 2 liter flask containing 500 ml. of the following medium which has been adjusted to pH 7.5 with dilute sodium hydroxide prior to sterilization:

| | |
|---|---|
| Bacto-Beef Extract (Difco) | 3.0 gm. |
| Bacto-Tryptose (Difco) | 5.0 gm. |
| Dextrose | 1.0 gm. |
| Starch (potato) | 24.0 gm. |
| Bacto-Yeast Extract (Difco) | 5.0 gm. |
| Calcium Carbonate | 2.0 gm. |
| Tap Water | 1000.0 ml. |

Incubate the flask and its contents for 72 hours at 28°C on a rotary shaker (280 r.p.m.; 2 inch stroke).

Add to a fermentor 10 liters of the following sterile production medium adjusted to pH 7.15 to 7.25 prior to sterilization:

| | |
|---|---|
| Trypticase | 170.0 gm. |
| Sodium Chloride | 50.0 gm. |
| Dipotassium Phosphate | 25.0 gm. |
| Dextrose | 25.0 gm. |
| Czapek-Dox Broth | 350.0 gm. |
| G.E. –60 Antifoam (General Electric Company) | As needed |
| Tap Water q.s. | 10.0 liters |

Inoculate this fermentor with 500 ml. of the 72 hour seed culture prepared above. Bring the temperature of the fermentation medium to 31° C and agitate at 500 r.p.m. while introducing an air flow through the medium at the rate of 0.5 liters of air per liter of broth per minute. Increase the agitation rate to 600 r.p.m. after 24 hours and to 700 r.p.m. after 48 hours. Terminate the fermentation at the end of 69 hours.

At the end of this period, the potency of the produced antibiotic reaches a peak which remains substantially constant. Throughout fermentation, the pH of the fermentation mixture remains substantially in the range of 7.2 to 8.2. The packed cell volume reaches a constant value of 3.5 – 4.5 ml. The whole broth gives a zone diameter of 15 – 25 mm when disc tested against S. aureus or P. aeruginosa.

EXAMPLE 2

Extraction of Antibiotic W847 Complex (Chromatographic Technique)

Adjust 60 liters of whole broth prepared according to the procedure described in Example 1 to pH 9.5 with dilute aqueous sodium hydroxide. Extract with 2 volumes of ethyl acetate for each volume of broth. Separate the solvent phase and concentrate under vacuum to obtain an oily residue (approximately 30.0 g.). This oily residue at 1/20 dilution gives a zone of inhibition diameter of about 20–30 mm against S. aureus and about 15–25 mm against P. aeruginosa. Purify the oily residue by column chromatography according to the following techniques:

Prepare a column using 1,000 g. of LH20 Sephadex (Pharmacia Fine Chemical, Inc.) suspended in 95 percent aqueous ethanol. Transfer the oily residue to the column and elute with 95 percent ethanol at a flow rate of 200 mg/hr. Collect 50 ml. fractions. Combine fractions according to their antibacterial activity (determined by agar disc testing against S. aureus ATCC 6538P). Concentrate fractions having peak activity to dryness. Dissolve the solid residue in a small amount of acetone and pour into an excess volume of petroleum ether (b.p. 30–60° C). Transfer the mixture of a dry ice-acetone bath (approximately −50° C) and allow to stand 20 minutes. Allow the mixture to return to room temperature and separate the mother liquor from the oily residue by decanting. Concentrate the mother liquor to dryness to obtain purified Antibiotic W847 Complex.

EXAMPLE 3

Extraction of Antibiotic W847 Complex (Acid Extraction Technique)

Adjust 37 liters of the broth obtained as described in Example 1 to pH 9.5 with 50 percent aqueous sodium hydroxide. Extract with two volumes of ethyl acetate for each volume of broth and evaporate the extract to a volume of 2,150 ml. Extract a 500 ml. aliquot of the ethyl acetate concentrate twice with 250 ml. portions of 0.5 percent (0.14N) hydrochloric acid or of 0.1N sulfuric acid. Make the combined acid extracts slightly alkaline by the addition of 5 percent aqueous sodium hydroxide (about pH 8.5 to 9.0) and extract twice with 250 ml. portions of ethyl acetate. Combine the ethyl acetate extracts and concentrate under reduced pressure to dryness.

The following three examples illustrate the transformation process of this invention as applied to the fermentation broth (Example 4), the isolated W847 Complex (Example 5) and the isolated C fraction (Example 6). All parts are by weight unless otherwise stated.

EXAMPLE 4

Production of Antibiotic W847–A by Direct Hydrolysis of Fermentation Broth

Add concentrated ammonium hydroxide to the total fermentation broth described in Example 1 to make the mixture 1N in NH₄OH, pH about 10.8 (270 ml. concentrated ammonium hydroxide per gallon of broth). Allow to stand at room temperature for 3 to 4 days. Add Supercel to the broth and filter the mixture. Extract the filtered broth once with one-fifth its volume of methylene chloride. Backwash the methylene chloride extract once with water. Concentrate the methylene chloride solution to low volume and add acetone and crystallize. Collect the crystalline W847–A by filtration and wash with ice-cold acetone. Combine the washings with the mother liquor and concentrate to obtain additional crops. Dry the product overnight at 50° in a vacuum oven, m.p. about 250° C (dec.).

EXAMPLE 5

Preparation of W847–A by Hydrolysis of W847 Complex

Dissolve 1 part of W847 complex (obtained as described in Example 3) in 7 parts of methanol and add 3 parts of water containing 0.67 parts of concentrated ammonium hydroxide, giving a 70% aqueous methanol solution which is 1N in NH₄OH. Allow this solution to stand at room temperature for 14 days. Add 15% of Darco (by weight of starting material), stir at room temperature for 30 minutes, filter and concentrate to about one-third volume under reduced pressure. Extract twice with one-half volumes of methylene chloride. Concentrate the combined methylene chloride extract to low volume and add acetone and crystallize. Collect the crystalline product by filtration and wash with ice-cold acetone. Combine the washings with mother liquor and concentrate to obtain a second crop. Dry the produce overnight at 50° in a vacuum oven, m.p. about 250° C (dec.).

EXAMPLE 6

Preparation of W847–A by Hydrolysis of W847–C Fraction

A. Preparation of W847–C Fraction

Dissolve 542 grams of W847 Complex (obtained as described in Example 3) in 5.4 liters of acetone and treat the resulting solution with 81 grams of decolorizing carbon for about 30 minutes at about room temperature. Remove the decolorizing carbon by filtration and concentrate the filtrate in vacuo to approximately 2.0 liters. Prepare a slurry of about 80 liters of ice and water and with vigorous stirring add the acetone solution. Allow the temperature of the resulting suspension to rise to about 25° C with stirring and collect the product by filtration. Wash the solids with a small quantity of water and dry at about 50° C in vacuo to yield about 212 grams of Antibiotic W847–C Complex.

Additional product (about 85 grams) may be obtained by concentration of the mother liquor.

B. Hydrolysis of W847–C Fraction

To a solution of 250 g. of this W847–C fraction in 1,900 ml. of methanol, add 25 g. of Darco and stir the mixture at room temperature for 30 minutes and then filter. To the filtrate add 166.5 ml. of concentrated ammonium hydroxide (15N) and make up the total volume to 2,500 ml. with methanol. Keep the solution which is now 1N in ammonium hydroxide at room temperature for 14 days, and then treat with 25 g. of Darco as before. Concentrate the filtered solution under reduced pressure and add acetone to afford a crystalline product. Heat the acetone on the steam bath for a short time to permit complete solution of impurities and optimum crystallization of the desired product, and then cool and filter the product. Concentration of the mother liquor gives additional crops. Wash the crystalline W847–A product with cold acetone and dry at 50° C in a vacuum oven.

The total yield of Antibiotic W847–A is 149.6 g. (60% by weight), m.p. about 250° C (dec.). W847–A may be recrystallized from acetone to give analytical material, m.p. 255°–259° C (dec.); $[\alpha]_D$ –90° (ethanol); Molecular Weight Found: 868 (benzene); Titration: N.E. 435, pKa 9.0; Anal. FD: C, 60.23; H, 9.28; N, 3.30 (average of two determinations).

As noted above, the W847–A component can itself be used directly as an antibiotic. It is also contemplated, however, that one can form derivatives of the thus-produced W847–A by esterification, salt formation and the like to optimize desired physical and/or pharmacological properties. Numerous other variants within the spirit of this invention will be apparent to one skilled in the art.

I claim:

1. The method of producing Antibiotic W847–A, which antibiotic is characterized by:

an antibacterial spectrum as described in Table 1; optical rotation, melting point, PKa, neutralization equivalent, elemental analysis, empirical formula, and molecular weight as described in Table 2; an infrared spectrum as shown in FIG. 1; and a nuclear magnetic resonance spectrum as shown in FIG. 5, comprising hydrolyzing an antibiotic selected from the group consisting of Antibiotic W847–B, Antibiotic W847–$C_{bs}$, Antibiotic W847–$C_2$ and mixtures thereof, which antibiotics are characterized by:

antibacterial spectra as described in Table 1; optical rotation, melting point, PKa, neutralization equivalent, elemental analysis, empirical formula, and molecular weight as described in Table 2; infrared spectra as shown in FIGS. 2, 3 and 4, respectively; and nuclear magnetic resonance spectra as shown in FIGS. 6, 7 and 8, respectively, in an aqueous medium having a pH in the range of about 9 to about 12 until said hydrolysis is substantially complete.

2. A method according to claim 1 wherein prior to hydrolysis the pH is adjusted to within the range of about 9 to about 12 by the addition of ammonium hydroxide.

3. A method according to claim 1 wherein the hydrolysis medium is 1N in ammonium hydroxide.

4. A method according to claim 1 wherein the hydrolysis reaction is conducted in solution containing a water miscible polar organic solvent.

5. A method according to claim 1 wherein after said conversion is substantially complete Antibiotic W847–A is isolated from the hydrolysis medium.

6. A method of producing Antibiotic W847–A, which antibiotic is characterized by:

an antibacterial spectrum as described in Table 1; optical rotation, melting point, PKa, neutralization equivalent, elemental analysis, empirical formula, and molecular weight as described in Table 2; an infrared spectrum as shown in FIG. 1; and a nuclear magnetic resonance spectrum as shown in FIG. 5;

comprising subjecting the Antibiotic W847 fermentation broth, produced by cultivating the microorganism Micromonospora Sp. W847 NRRL 3274 and NRRL 3275 in an aqueous nutrient medium under submerged aerobic conditions until substantial antibiotic activity is imparted thereto, to hydrolysis at pH in the range of about 9 to about 12 until said hydrolysis is substantially complete.

7. A method according to claim 6 wherein a filter aid is added to the broth and the broth is filtered.

8. A method according to claim 6 wherein after said hydrolysis is substantially complete Antibiotic W847–A is isolated from the hydrolysis medium.

\* \* \* \* \*